US011110663B2

United States Patent
Yan et al.

(10) Patent No.: US 11,110,663 B2
(45) Date of Patent: Sep. 7, 2021

(54) POLYMER MULTI-MATERIAL HIGH-FLEXIBILITY LASER ADDITIVE MANUFACTURING SYSTEM AND METHOD THEREOF

(71) Applicant: Huazhong University of Science and Technology, Hubei (CN)

(72) Inventors: Chunze Yan, Hubei (CN); Hongzhi Wu, Hubei (CN); Yusheng Shi, Hubei (CN); Shifeng Wen, Hubei (CN); Lichao Zhang, Hubei (CN)

(73) Assignee: Huazhong University of Science and Technology, Hubei (CN)

( * ) Notice: Subject to any disclaimer, the term of this patent is extended or adjusted under 35 U.S.C. 154(b) by 309 days.

(21) Appl. No.: 16/248,296

(22) Filed: Jan. 15, 2019

(65) Prior Publication Data
US 2020/0031057 A1   Jan. 30, 2020

(30) Foreign Application Priority Data
Jul. 28, 2018   (CN) .......................... 201810850179.8

(51) Int. Cl.
*B29C 64/393* (2017.01)
*B33Y 50/02* (2015.01)
(Continued)

(52) U.S. Cl.
CPC .......... *B29C 64/393* (2017.08); *B29C 64/118* (2017.08); *B29C 64/209* (2017.08);
(Continued)

(58) Field of Classification Search
CPC ... B29C 64/118; B29C 64/209; B29C 64/227; B29C 64/241; B29C 64/268; B29C 64/393; B33Y 10/00; B33Y 30/00; B33Y 50/02
See application file for complete search history.

(56) References Cited

U.S. PATENT DOCUMENTS

| | | | |
|---|---|---|---|
| 2015/0283751 A1* | 10/2015 | O'Neil | B29C 48/02 264/308 |
| 2019/0210286 A1* | 7/2019 | Newell | B29C 64/379 |

FOREIGN PATENT DOCUMENTS

| | | |
|---|---|---|
| CN | 104118121 A | 10/2014 |
| CN | 107116220 A | 9/2017 |

(Continued)

*Primary Examiner* — Yuhui R Pan
(74) *Attorney, Agent, or Firm* — Hamre, Schumann, Mueller & Larson, P.C.

(57) ABSTRACT

The invention belongs to the field of filament additive manufacturing, and discloses a polymer multi-material high-flexibility laser additive manufacturing system and a method thereof. The system comprises a first robot arm, a second robot arm, a positioner, a rotational extrusion nozzle in which a plurality of extrusion modules are disposed and a laser, each extrusion module is used for extruding one kind of filament, and the rotational extrusion nozzle is connected with the first robot which drives the rotational extrusion nozzle to move according to a preset trajectory; the laser is connected with the second robot, and is used for emitting a laser to fuse the filament extruded from the rotational extrusion nozzle, and through the cooperative motion of the first robot and the second robot, the extrusion and fusion of the filament are performed synchronously; the positioner serves as a forming mesa, and the rotation of the positioner cooperates with the motions of the two robots. With the present invention, problems such as easy blocking and short service life of the extrusion nozzle in the FDM forming are solved, thereby ensuring high flexibility of the manufacturing system and achieving the extrusion forming of the multi-material filaments.

8 Claims, 2 Drawing Sheets

(51) Int. Cl.
*B33Y 10/00* (2015.01)
*B33Y 30/00* (2015.01)
*B29C 64/118* (2017.01)
*B29C 64/209* (2017.01)
*B29C 64/268* (2017.01)

(52) U.S. Cl.
CPC ............ *B29C 64/268* (2017.08); *B33Y 10/00* (2014.12); *B33Y 30/00* (2014.12); *B33Y 50/02* (2014.12)

(56) References Cited

FOREIGN PATENT DOCUMENTS

| CN | 107263858 A | 10/2017 |
| CN | 206733600 U | 12/2017 |
| CN | 207028180 U * | 2/2018 |

* cited by examiner

POLYMER MULTI-MATERIAL HIGH-FLEXIBILITY LASER ADDITIVE MANUFACTURING SYSTEM AND METHOD THEREOF

TECHNICAL FIELD

The present invention belongs to the field of additive manufacturing of filaments, and more particularly, relates to a polymer multi-material high-flexibility laser additive manufacturing system and a method thereof.

BACKGROUND OF THE INVENTION

In the field of polymer additive manufacturing, Fused Deposition Modeling (FDM) technology has a significant position due to its low operating cost, extensive forming materials and simple post-treatment. In the FDM forming process, the polymer filament is transported to a nozzle by a filament-feeding mechanism and heated to a fused state, and solidified into a desired shape in the air after extrusion.

At present, FDM technology still has following shortcomings: (1) A phenomenon of hot extrusion nozzle blocking often occurs during the printing process, which is mainly caused by the mismatch between the filament-feeding rate and the filament melting rate. The unmelted filaments penetrate into the fused material that has been melted but not yet extruded, causing the overflow to a gap of the fused material that will be cooled and solidified at the feed end, so that the extrusion nozzle is blocked. Chinese Patent Application Publication No. 104118121 discloses an anti-blocking extrusion nozzle of an FDM printer, which greatly reduces the heating space and fuses the filament quickly by adding a thin heating aluminum block, a T-type preheating aluminum block and a thermostatic aluminum block, so that the problem of extrusion nozzle blocking is solved to a certain extent. However, such an anti-blocking extrusion nozzle incorporates a plurality of parts such as multiple aluminum blocks and temperature sensors, resulting in a complicated structure and difficulty in precise processing. Moreover, factors such as unevenness in the properties of the filament, often containing impurities and abnormal solidification may also cause the extrusion nozzle to be blocked, and in this case, the anti-blocking printing extrusion nozzle described above cannot solve these problem; (2) some residual melting material tends to exist in the extrusion nozzle, which will be solidified and remained at the nozzle after cooling. Since the printing nozzle is generally 0.4 mm and is a key part of the printing spray head, it is difficult to clean the residual material, and an improper cleaning operation may also damage the nozzle, which will seriously affect the printing accuracy; (3) if the printing parts are complicated in structure and large in size, the printing extrusion nozzle will work at a higher temperature for a long time (the common printing temperature of ABS, PLA is about 200° C.), which will influence the service life of the printing extrusion nozzle; (4) the elasticity and flexibility of the forming process need to be improved, the filament is extruded in the vertical direction, and the forming of the product in the height direction is fulfilled by a method of lowering the lifting platform. The low flexibility of such processing limits the further improvement of precision of the product; (5) most of the current FDM printers are in an inherent single-spray-head mode, which can only achieve the fabrication of one kind of material. However, with the development of technology and the strategic needs of the country, the multi-material processing has become a research hotspot.

Chinese Patent Application Publication No. 107116220 discloses an electric-field driven fused metal spray deposition 3D printing device and a working method thereof, which are directed to the preparation of a metal multi-material; Chinese Patent Application Publication No. 206733600 discloses a device that can realize the multi-material level composite 3DP with a single extrusion nozzle, which mainly uses the ceramic powder or hydrogel as printing materials, and its application is limited to the field of biomedical material processing; Chinese Patent Application Publication No. 107263858 discloses a heterogeneous multi-material additive manufacturing system, which adopts a rotary type multi-spray-head structure to realize the multi-material additive manufacturing, but the device still uses the existing hot extrusion nozzle, and cannot overcome the problem that the extrusion nozzle is easily blocked. Moreover, the processing flexibility needs to be further improved. It can be seen that the research on the multi-material high-flexibility additive manufacturing for polymer is insufficient, and is in a relatively blank state.

SUMMARY OF THE INVENTION

In view of the above defects or improvement requirements in the prior art, the present invention provides a polymer multi-material high-flexibility laser additive manufacturing system and a method thereof, in which through providing the forming device and the forming method, the forming process is in a "point-by-point forming bulk" mode, and through providing a positioner, the working mesa is flexibly adjustable, and is particularly suitable for the manufacturing of a product with a complicated structure. In addition, an extrusion process is separately performed from a filament fusing process set outside an extrusion unit, which greatly reduces the blocking of the extrusion nozzle during the extrusion process, and prolongs the service life of the extrusion nozzle.

In order to achieve the above objectives, according to an aspect of the present invention, there is provided a polymer multi-material high-flexibility laser additive manufacturing system, characterized in that the system includes a first robot arm, a second robot arm, a positioner, a rotational extrusion nozzle and a laser, wherein:

the rotational extrusion nozzle is used for extruding filaments and is provided with a plurality of extrusion modules, each extrusion module is used for extruding one kind of filament, the position of the respective extrusion module is adjusted by rotating the rotational extrusion nozzle to achieve switching of the extruded filaments, the rotational extrusion nozzle is connected with the first robot, and the first robot moves according to a preset trajectory to drive the rotational extrusion nozzle to move, so that switching of the extrusion filaments is achieved;

the laser is connected with the second robot, and is used for emitting a laser to fuse the filament extruded from the rotational extrusion nozzle, and through the cooperative motion of the two robots, the extrusion and fusion of the filament are performed synchronously;

the positioner serves as a processing mesa, and a forming angle is adjusted by rotating the positioner to cooperate with motions of the two robots simultaneously, and motion trajectories of the positioner, the first robot and the second robot cooperate with each other without mutual interference.

Further preferably, it is characterized in that the positioner includes a horizontal workbench, a horizontal rotating shaft and a vertical rotating shaft, and the horizontal workbench rotates around the horizontal and vertical rotating shafts to achieve the adjustment of the forming angle.

Further preferably, the rotational extrusion nozzle comprises a rotary plate, a fixed plate and the plurality of extrusion modules, wherein the plurality of extrusion module are disposed in the fixed plate that is connected with the rotary plate, the rotary plate rotates to drive the fixed plate to rotate, and then to drive the extrusion module to rotate.

Further preferably, the first robot and the second robot are identical in structure, and each employs a multi-axis robot.

Further preferably, the laser generated by the laser is transmitted by an optical fiber, and parameters of the laser are adjustable in real time. When the kind of the material changes, the parameters of the laser are adjusted in real time to accommodate the needs of different filaments.

According to another aspect of the present invention, there is provided an additive manufacturing method using the system described above, comprising the following steps:

(a) constructing a three dimensional model of a product to be fabricated, performing voxel slicing on the three dimensional model, and obtaining a set of all data points of the entire product;

(b) setting motion trajectories of the first robot and the second robot, a rotation order of the rotational extrusion nozzle and a motion trajectory of the positioner according to the set of data points of the product;

(c) extruding different filaments in sequence according to the rotation order of the rotational extrusion nozzle while driving the rotational extrusion nozzle by the first robot to move according to the motion trajectory, and fusing the extruded filaments in real time by the laser driven by the second robot, wherein the positioner adjusts its angle correspondingly according to its motion trajectory to accommodate the motions of the two robots, in which way the extrusion fusing formation of all points in the set of all data points is achieved, that is, the process of point-by-point formation is achieved, thereby obtaining the product.

In general, the above technical solutions conceived by the present invention can achieve the following beneficial effects compared with the prior art:

1. in the present invention, two robots are used, one driving a rotational extrusion nozzle and the other driving a laser head, wherein diversification of kind of the extruded filament is realized by a plurality of extrusion modules disposed in the rotational extrusion nozzle, and the mutual cooperation between the two robots allows the extrusion and fusing to be performed synchronously, thereby achieving the laser fusing formation of the multi-material filament;

2. in the present invention, by using two robots to connect the rotational extrusion nozzle and the laser head respectively, the fusing of the filament is separated from the extrusion module, and thus, the extrusion process and the fusing process are separated, thereby avoiding the blocking of the extrusion nozzle when they are both performed in the extrusion unit, reducing the difficulty of cleaning the extrusion nozzle and prolonging the service life of the extrusion nozzle;

3. in the present invention, by using a positioner as a working mesa which can be rotated in the horizontal and vertical directions, the formation process of point-by-point forming bulk of the product is realized, and in addition, by adjusting the angle of the positioner when forming a corner position of the product, the extrusion module extrudes the filament more easily, thereby reducing the forming difficulty and improving the flexibility and accuracy during forming when a subtle and complicated structure is formed or the filament feeding is obstructed;

4. in the present invention, by fusing the filament with a laser, the energy is concentrated, and the high-temperature resistant and high-performance polymer (such as PEEK material) can also be easily fused, which greatly improves the problem that the high-temperature resistant and high-performance polymer is difficult to be formed. Moreover, the laser is transmitted by a flexible optical fiber, and in conjunction with the motion of the positioner, these devices significantly improve the flexibility of the manufacturing method provided by the present invention, which is very advantageous for the improvement of product performance.

BRIEF DESCRIPTION OF THE DRAWINGS

In all Figures, the same elements or structures are denoted by the same reference numerals, in which.

1—first robot 2—second robot 3—positioner 31—horizontal rotating shaft 32—vertical rotating shaft 33—horizontal workbench 4—laser 5—laser head 6—rotational extrusion nozzle 61—rotary plate 62—fixed plate 63—extrusion module 631—roller 632—driving motor 633—extrusion nozzle 7—controller 8—robot workbench

DETAILED DESCRIPTION OF THE EMBODIMENTS

For clear understanding of the objectives, solutions and advantages of the present invention, detailed description of the present invention will be given below in conjunction with accompanying drawings and specific embodiments. It should be understood that the embodiments described herein are only meant to explain the present invention, and not to limit the scope of the present invention. Furthermore, the technical features related to the embodiments of the present invention described below can be mutually combined if they are not found to be mutually exclusive.

Figure 1:
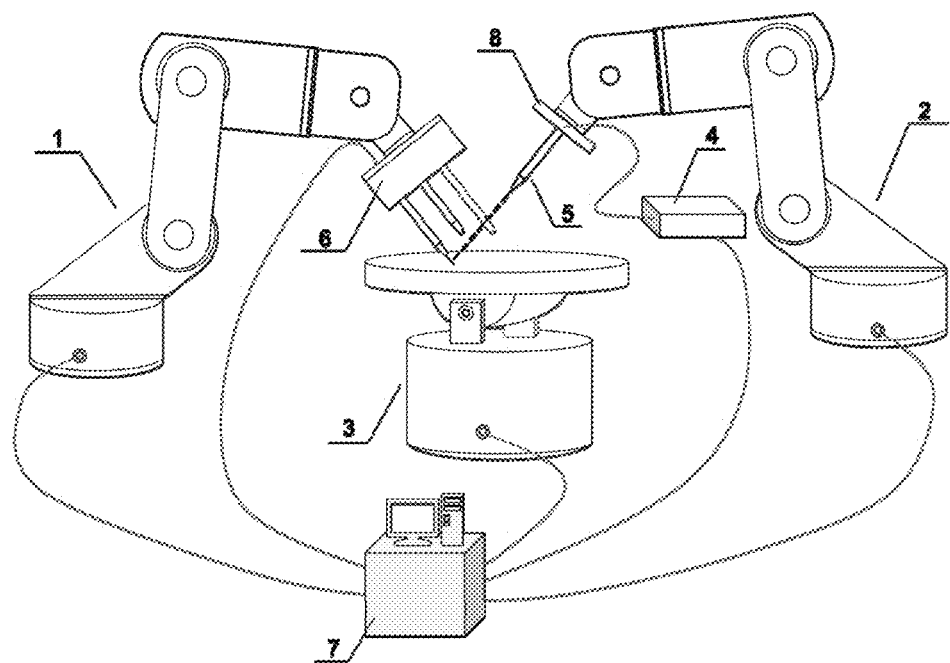
FIG. 1 is a schematic view showing a structure of a polymer multi-material high-flexibility laser additive manufacturing device constructed in accordance with a preferred embodiment of the present invention.

FIG. 1 is a processing device constructed by a polymer multi-material high-flexibility laser additive manufacturing method provided in accordance with the present invention, and this system is composed of a first robot 1, a second robot 2, a positioner 3, a laser 4, and a laser head 5, a rotational extrusion nozzle 6, a controller 7 and a robot workbench 8. The first robot 1 drives the rotational extrusion nozzle 6 to complete the multi-material filament feeding, the second robot 2 drives the laser head 5 to emit laser to fuse the filament, and the controller controls the other components of the device, having the characteristics of integration and modularization.

Figure 2:
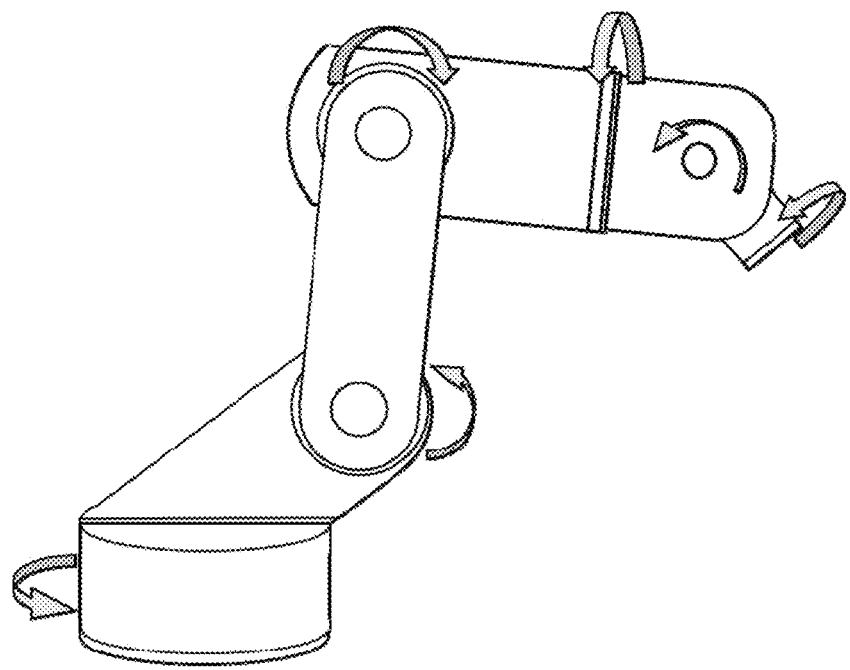
FIG. 2 is a schematic view showing a structure of a six-axis robot constructed in accordance with the preferred embodiment of the present invention.

FIG. 2 shows a selected six-axis robot for a polymer multi-material high-flexibility laser additive manufacturing method provided in accordance with the present invention. In the present invention, two robots are used, one driving the rotational extrusion nozzle and the other driving the laser head. The two robots have the same six-axis structure and working principle. The first robot 1 has six degrees of freedom, and six arrows in FIG. 2 respectively indicate the directions of rotation of the six axes, which can ensure that the robot arm can adapt to the processing at almost any angle and trajectory and can meet the needs of actual forming. The six-axis robot can achieve fully automated work with a controllable error rate. More critically, the two robots are not isolated from each other, but closely collaborated, and the first robot 1, the second robot 2 and the positioner 3 are controlled by a linkage program in the controller 7 simultaneously, and the three cooperate with each other without mutual interference. The controller is characterized by integration and modularization, and all components are coordinated to work under the "one-stop" control of the system, so that the manufacturing method is powerful in function and high in operability.

Figure 3:
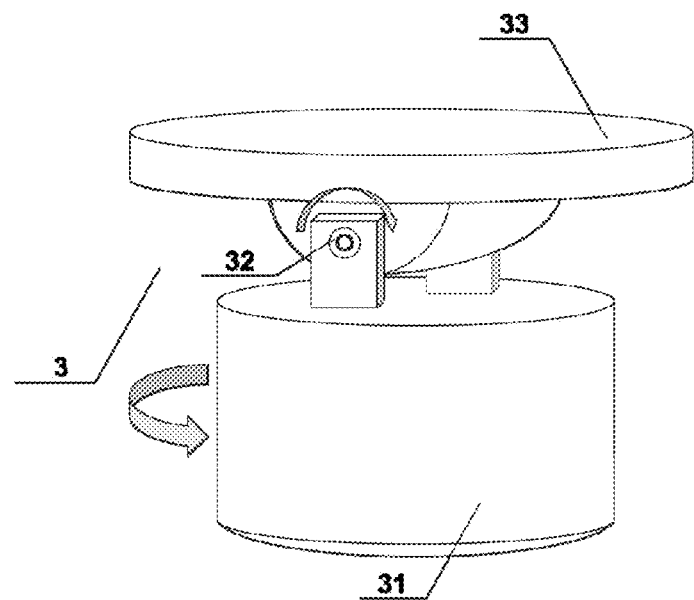
FIG. 3 is a schematic view showing a structure of a positioner constructed in accordance with the preferred embodiment of the present invention.

FIG. 3 shows a selected positioner for a polymer multi-material high-flexibility laser additive manufacturing method provided in accordance with the present invention. The positioner is mainly composed of three parts: a horizontal rotating shaft 31, a vertical rotating shaft 32 and a forming workbench 33. The forming workbench 33 is the forming base plane of the product, and the horizontal and vertical rotating shafts 31 and 32 enable the positioner to have two degrees of freedom, so that the flexibility of the entire processing device is further improved on the basis of having high flexibility on account of two robots. When forming some fine and complicated structures, although the forming process can be performed by the filament feeding driven by the six-axis robot, the shape accuracy and dimensional accuracy of the formed structure are not guaranteed. At this time, in conjunction with the positioner, the forming workbench is rotated to cooperate with the filament feeding of the robot when appropriate, and thus, the processing flexibility is greatly improved, which is very advantageous for the improvement of the flexibility and accuracy of the filament feeding.

Figure 4:
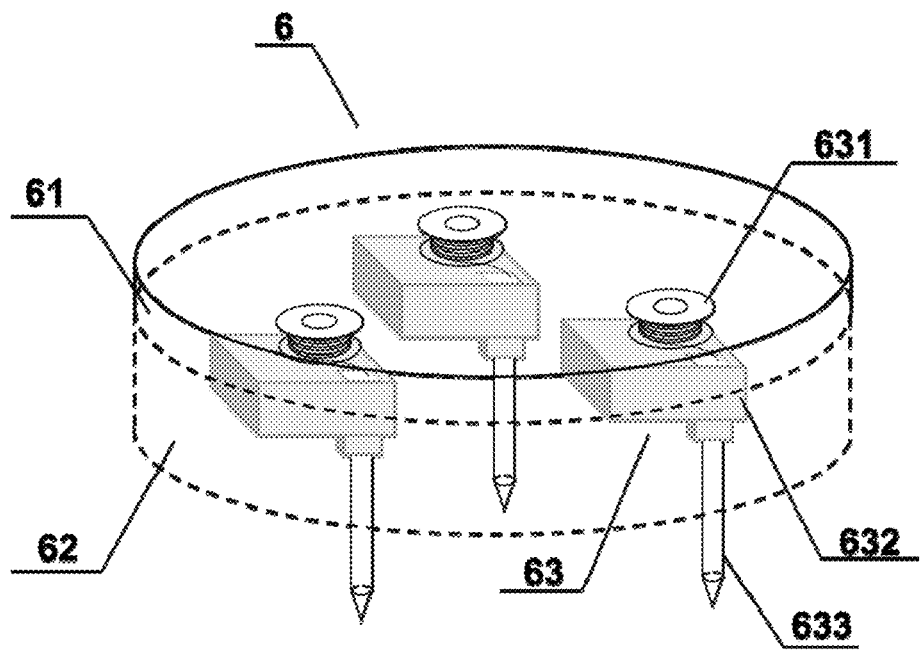
FIG. 4 is a schematic view showing a structure of a rotational extrusion nozzle constructed in accordance with the preferred embodiment of the present invention.

FIG. 4 is a selected rotational extrusion nozzle for a polymer multi-material high-flexibility laser additive manufacturing method provided in accordance with the present invention. The rotational extrusion nozzle 6 is composed of a real-time rotary plate 61, a fixed plate 62, and filament transfer modules 63. The real-time rotary plate 61 drives the fixed plate 62. In this embodiment, the filament feeding system includes three filament transfer modules 63 configured to transfer different kinds of filaments to realize the multi-material forming. The filament transfer module 63 is mainly composed of a filament supply roller 631, a driving motor 632 and a spray nozzle 633. The filament supply roller is used to place the filament, which is fused under the irradiation of laser while being extruded from the spray nozzle.

Further preferably, the robots that drive the rotational extrusion nozzle and the laser head each have a high degree of freedom, and are preferably six-axis robots.

Further preferably, the rotational extrusion nozzle can be quickly modified according to the kinds of materials of the actual products, and the number of the extrusion nozzles is equal to the number of kinds of materials.

Further preferably, the laser is transmitted by the optical fiber and the polymer material has a high absorption rate thereto.

Further preferably, the positioner has two degrees of freedom, which further improves the flexibility of the forming process.

Further preferably, the robots, the laser, the rotary multi-spray-head device, and the positioner are all connected with a computer to form an integrated and modular control system, and the "one-stop" control of the respective components can be realized by controlling the control system.

Further preferably, the controller is provided with a linkage control system to ensure coordination and non-interference between the two robots and the positioner.

The above is a detailed description of the structure of the device constructed by a polymer multi-material high-flexibility laser additive manufacturing method according to the present invention, and the specific manufacturing method is as follows:

(1) The 3D model of the product is introduced into the controller 7, and voxel slicing is performed on the model first to obtain a set of a plurality of data points and position information of the respective data points, thereby obtaining a set of spatial data points of the product from the result of the voxel slicing;

(2) For the set of spatial data points determined in the step (1), different materials are set at different points according to the product requirements (three kinds of materials can be set in this embodiment), the settings here can be processed in batch, but the material information is stored in units of unit point. The motion trajectory of the robot and the motion trajectory of the positioner are generated after obtaining the spatial data information and the material information of the product model, and the motion trajectory of the positioner includes the time node of the angle change of the positioner and the changed angle;

(3) The rotational extrusion nozzle as shown in FIGS. 1 and 4 is used for transferring filaments a, b and c according to the requirements of the product, and when the material a is required, the controller 7 controls the rotational extrusion nozzle to rotate and extrude the material a from the extrusion nozzle; the laser head 5 driven by the robot 2 emits a laser adapted to the filament a to fuse the filament a. Similarly, when the material b or c is required, the rotational extrusion nozzle is controlled to rotate and extrude the material b or c from the extrusion nozzle. Parameters of the laser 4 can be switched in real time, so that the generated laser can be adapted to the filament. When the filament feeding device encounters an obstacle in the accurate filament feeding during the formation of a fine and complicated structure, the positioner 3 is adjusted to an optimum position by the rotation of the horizontal and vertical rotating shaft 31 and 32 to cooperate with the robot 1, which greatly improves the flexibility and accuracy of the filament feeding. The robot 1, the robot 2 and the positioner 3 cooperatively work under the control of the linkage program in the controller, and cooperate with each other without interfering with each other;

(4) From the perspective of formation, the basic constituent unit of the product is a spatial "unit point", and each unit point corresponds to one kind of material. Repetitive cycle is performed according to the step (3) to form the point-by-point formation of the product in space is formed, and finally the physical product is obtained. Compared with the existing FDM technology, the manufacturing method provided by the present invention is more flexible, and is no longer in a "point-by-point forming face, face-by-face forming bulk" mode, and no longer relies on the lowering of the forming mesa to achieve the formation of the product in the height direction;

The point-by-point forming in space allows the manufacturing method provided by the present invention to no longer rely on the conventional workbench lowering, but "grow" the product on the working mesa of the positioner. Due to the introduction of the robots and the positioner, the processing flexibility is sharply improved.

It should be readily understood to those skilled in the art that the above description is only preferred embodiments of the present invention, and does not limit the scope of the present invention. Any change, equivalent substitution and modification made without departing from the spirit and principle of the present invention should be included within the scope of the protection of the present invention.

What is claimed is:

1. A polymer multi-material high-flexibility laser additive manufacturing system, wherein that wherein the system includes a first robot, a second robot separated from the first robot, a positioner, a rotational extrusion nozzle and a laser, wherein:

the rotational extrusion nozzle is used for extruding filaments and is provided with a plurality of extrusion modules, each extrusion module is used for extruding one kind of filament, the position of the respective extrusion module is adjusted by rotating the rotational extrusion nozzle to achieve switching of the extruded filaments, the rotational extrusion nozzle is connected with the first robot, and the first robot moves according to a preset trajectory to drive the rotational extrusion nozzle to move, so that switching of the extrusion filaments is achieved;

the laser is connected with the second robot, and is used for emitting a laser to fuse the filament after the filament is extruded from the rotational extrusion nozzle, and through the cooperative motion of the first robot and the second robot, the extrusion and fusion of the filament are performed synchronously and separately;

the positioner serves as a processing mesa, and a forming angle is adjusted by rotating the positioner to cooperate with motions of the two robots simultaneously, and motion trajectories of the positioner, the first robot and the second robot cooperate with each other without mutual interference.

2. The system according to claim 1, wherein the positioner includes a horizontal workbench, a horizontal rotating shaft and a vertical rotating shaft, and the horizontal workbench rotates around the horizontal and vertical rotating shafts to achieve the adjustment of the forming angle.

3. The system according to claim 1, wherein the rotational extrusion nozzle includes a rotary plate, a fixed plate and the plurality of extrusion module, wherein the plurality of extrusion module are disposed in the fixed plate that is connected with the rotary plate, the rotary plate rotates to drive the fixed plate to rotate, and then to drive the extrusion module to rotate.

4. The system according to claim 1, wherein the first robot and the second robot are identical in structure, and each employs a multi-axis robot.

5. The system according to claim 1, wherein the laser generated by the laser is transmitted by an optical fiber, and parameters of the laser are adjustable in real time, so that when the kind of the material changes, the parameters of the laser are adjusted in real time to accommodate the needs of different filaments.

6. An additive manufacturing method using the system according to claim 1 wherein the method comprises the following steps of:

(a) constructing a three-dimensional model of a product to be fabricated, performing voxel slicing on the three-dimensional model, and obtaining a set of all data points, with information of position and material, of the entire product;

(b) setting motion trajectories of the first robot and the second robot, a rotation order of the rotational extrusion nozzle and a motion trajectory of the positioner according to the set of data points of the product;

(c) extruding different filaments in sequence according to the rotation order of the rotational extrusion nozzle while driving the rotational extrusion nozzle by the first robot to move according to the motion trajectory, and fusing the extruded filaments in real time by the laser driven by the second robot, wherein the positioner adjusts its angle correspondingly according to its motion trajectory to accommodate the motions of the first robot and the second robot, in which way the extrusion fusing formation of all points in the set of all data points is achieved, that is, the process of point-by-point formation is achieved, thereby obtaining the product.

7. The system according to claim 1, wherein the first robot has six degrees of freedom, the second robot has six degrees of freedom, the positioner has two degrees of freedom, and the laser is transmitted by an optical fiber.

8. The system according to claim 7, wherein the system is configured to perform voxel slicing on a three-dimensional model of a product to be fabricated.

* * * * *